(12) United States Patent
Elasser et al.

(10) Patent No.: US 9,899,838 B2
(45) Date of Patent: Feb. 20, 2018

(54) POWER DELIVERY SYSTEM AND METHOD

(71) Applicant: General Electric Company, Schenectady, NY (US)

(72) Inventors: Ahmed Elasser, Niskayuna, NY (US); Jeremy Daniel Van Dam, Niskayuna, NY (US); David Allan Torrey, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 691 days.

(21) Appl. No.: 14/337,782

(22) Filed: Jul. 22, 2014

(65) Prior Publication Data

US 2015/0380938 A1 Dec. 31, 2015

Related U.S. Application Data

(60) Provisional application No. 62/016,969, filed on Jun. 25, 2014.

(51) Int. Cl.
*H02J 3/26* (2006.01)
*E21B 43/12* (2006.01)
*H02M 5/257* (2006.01)

(52) U.S. Cl.
CPC .............. *H02J 3/26* (2013.01); *E21B 43/128* (2013.01); *H02M 5/2573* (2013.01); *Y02E 40/50* (2013.01)

(58) Field of Classification Search
None
See application file for complete search history.

(56) References Cited

U.S. PATENT DOCUMENTS

| 2,938,090 A | 5/1960 | Weber |
| 2,997,609 A | 8/1961 | Lung |
| 3,638,732 A | 2/1972 | Huntsinger et al. |
| 6,167,965 B1 | 1/2001 | Bearden et al. |

(Continued)

FOREIGN PATENT DOCUMENTS

| CN | 2160777 Y | 4/1994 |
| JP | 61251498 A | 11/1986 |

OTHER PUBLICATIONS

PCT Search Report and Written Opinion issued in connection with corresponding Application No. PCT/US2015/036897 dated Oct. 14, 2015.

*Primary Examiner* — Jared Fureman
*Assistant Examiner* — Aqeel Bukhari
(74) *Attorney, Agent, or Firm* — Pabitra K. Chakrabarti

(57) ABSTRACT

Power delivery systems and methods described herein conductively couple several input lines with a cable that conducts a multi-phase electric current. The input lines separately conduct different phases of the electric current. Output lines are conductively coupled with plural machines, and separately conduct the different phases of the electric current. Plural switching devices are conductively coupled with the input lines and with the output lines, and are used to control the switching devices in order to conduct the different phases of the electric current to the machines. A first set of the switching devices is closed to separately conduct the different phases of the electric current to a first machine of the machines. A different, second set of the switching devices is separately closed to separately conduct the different phases of the electric current to a different, second machine of the machines.

22 Claims, 3 Drawing Sheets

(56) References Cited

U.S. PATENT DOCUMENTS

| | | |
|---|---|---|
| 7,314,084 B2 | 1/2008 | Rodrigues et al. |
| 7,931,090 B2 | 4/2011 | Smedstad et al. |
| 8,353,352 B2 | 1/2013 | Leitch |
| 8,633,623 B2 | 1/2014 | Bingler |
| 2003/0170077 A1 | 9/2003 | Herd et al. |
| 2010/0247335 A1 | 9/2010 | Atherton |
| 2011/0114327 A1 | 5/2011 | Wilson |
| 2013/0169044 A1 | 7/2013 | Stinessen et al. |
| 2015/0340860 A1* | 11/2015 | Tenca ........................ H02J 1/08 307/31 |

* cited by examiner

POWER DELIVERY SYSTEM AND METHOD

CROSS-REFERENCE TO RELATED APPLICATIONS

This application claims priority to U.S. Provisional Application No. 62/016,969, which was filed on 25 Jun. 2014, and is titled "Power Delivery System And Method," the entire disclosure of which is incorporated by reference.

FIELD

Embodiments of the subject matter described herein relate to switches that control conduction of electric currents to one or more loads.

BACKGROUND

Various electric systems include switches that control conduction of electric currents to one or more loads. For example, in oil or gas mining operations, submersible pumps may be disposed in a well to remove oil or gas from the well. These pumps may be powered by three-phase electric currents supplied from power cables. The cables extend from power sources disposed outside of the well. The cables extend into the well to respective pumps in order to conduct the currents from the power sources to the machines. Typically, each three-phase cable powers a separate machine. As a result, each machine can be individually controlled by controlling when the current is conducted along the respective cable to the machine.

Because the pumps are located far from the power sources, the cables that supply the current to the pumps are very long. As the length of the cables increase, the cost to provide power to the pumps increases. In some systems, the cost of providing the cables of sufficient length to reach the pumps can be 40% or more of the total system cost, the system being comprised of the power source, cable, and motor-driven pump.

Additionally, the environment in which the pumps are located within the well can be harsh. The pumps can be exposed to temperatures in excess of 180 degrees Celsius, to pressure differentials on the order of 5,000 pounds per square inch, to mechanical vibrations, and the like. As a result, equipment that is placed into the well with the pumps needs to be able to operate in these extreme environments. Because of the harshness of this environment and the need for system reliability, if a first pump fails, it is advantageous to have a second pump installed. This is to avoid the costly and time consuming operation of retrieving the failed pump and replacing it. It is desirable to have a system where two redundant pumps may be installed with only a single power cable.

BRIEF DESCRIPTION

In one embodiment, a system (e.g., a power delivery system) includes plural conductive input lines, plural conductive output lines, and a switch assembly. The input lines are configured to be conductively coupled with a cable that conducts a multi-phase electric current to the input lines. The input lines also are configured to separately conduct different phases of the electric current. The output lines are configured to be conductively coupled with plural machines, and can be configured to separately conduct the different phases of the electric current. The switch assembly has plural switching devices conductively coupled with the input lines and with the output lines, and is configured to control the switching devices in order to conduct the different phases of the electric current to the machines. The switch assembly is configured to close a first set of the switching devices to separately conduct the different phases of the electric current to a first machine of the machines. The switch assembly also is configured to separately close a different, second set of the switching devices to separately conduct the different phases of the electric current to a different, second machine of the machines.

In another embodiment, another system (e.g., a power delivery system) includes a switch assembly having plural switching devices conductively coupled and disposed between a cable that supplies a multi-phase electric current and with separate machines that are powered by the electric current. The switch assembly also is configured to control different sets of the switching devices to separately conduct different phases of the electric current to the machines. Each of the switching devices in each of the sets of the switching devices is configured to conduct a different phase of the phases of the electric current.

In another embodiment, a method for powering multiple machines from a cable includes conductively coupling plural conductive input lines with a cable that conducts a multi-phase electric current to the input lines so that the input lines separately conduct different phases of the electric current, conductively coupling plural conductive output lines configured to be conductively coupled with plural machines so that the output lines separately conduct the different phases of the electric current, conductively coupling plural switching devices of a switching assembly with the input lines and with the output lines so that the switch assembly controls the switching devices in order to conduct the different phases of the electric current to the machines, closing a first set of the switching devices to separately conduct the different phases of the electric current to a first machine of the machines, and separately closing a different, second set of the switching devices to separately conduct the different phases of the electric current to a different, second machine of the machines.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
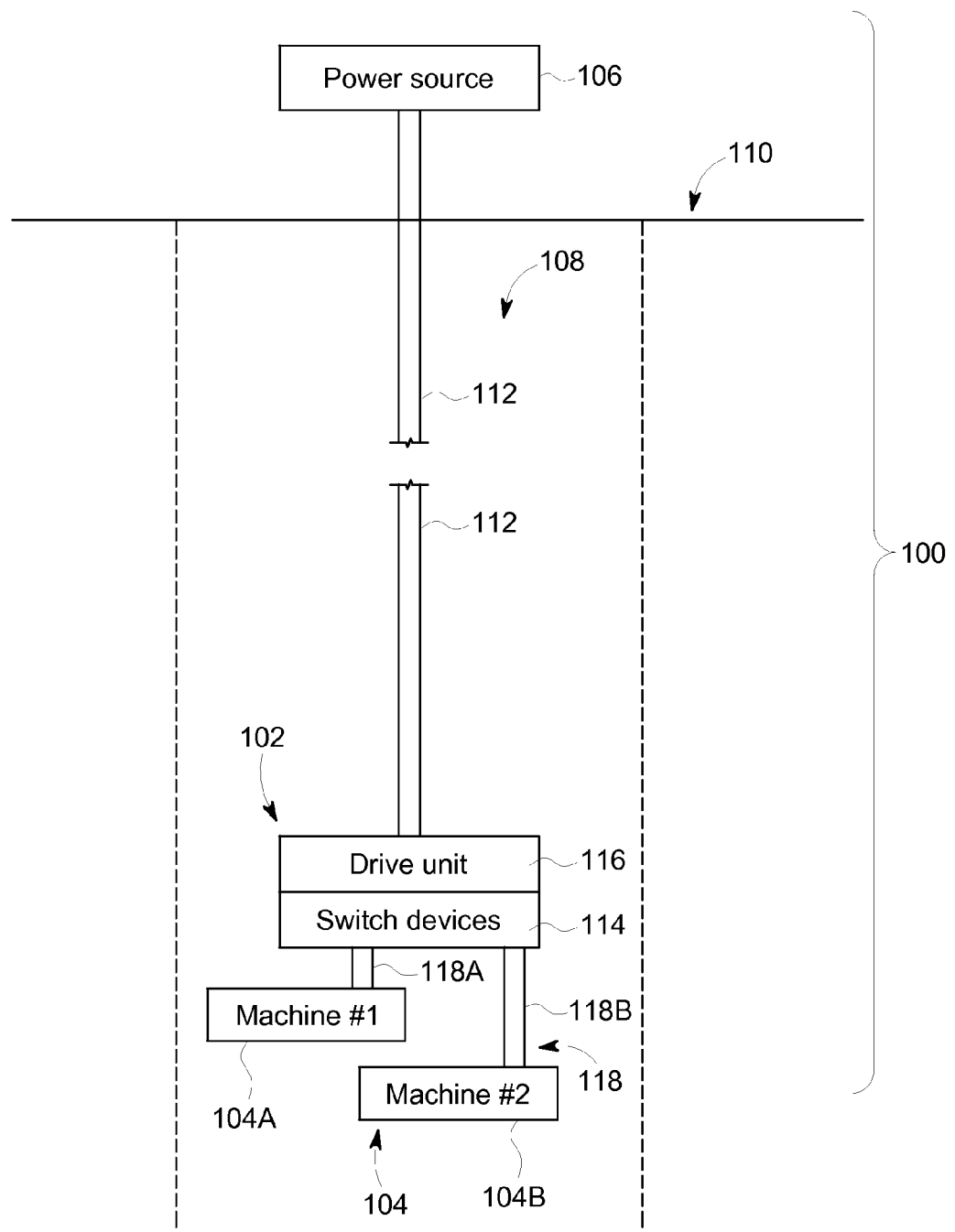
FIG. 1 illustrates a schematic diagram of a power delivery system having one embodiment of a switch assembly.

One or more embodiments of the inventive subject matter described herein relate to switch assemblies and methods that control the supply of electric current to two or more electrical devices, such as electric motors. As one example, a switch assembly can be a submersible switch that directs power as commanded to one or more electric submersible pumps (ESPs) that are within the same well as the switch assembly. Optionally, the switch assembly may be another type of switch and/or direct power to another type of machine. The switch assembly may operate within a harsh environment characterized by high temperature (e.g., temperatures of 180 degrees Celsius or more), high pressure (e.g., up to 5000 psi), high vibration, and the like, while supporting medium voltage (e.g., a few kV to 10s of kVs or another value) and megawatt-level power flow. The switch assembly may be controllable through a variant of power-line carrier communication technology or the like. Alternatively, the switch assembly may be controlled in another manner.

In one embodiment, the switch assembly accepts a multi-phase electric current cable. For example, the assembly may receive a three-phase power cable input. The switch assembly is controlled to selectively direct the input power among a plurality of output cables to two or more machines, such as two or more pumps. The switch assembly can control which of the machines receive the three phase power cable input. For example, the switch assembly can connect either machine, some but not all machines, all machines, or no machines to the power cable input.

The switch assembly can be formed by devices that are able to support alternating voltage and current. As one example, the switch assembly may include several solid state switching devices. In a solid state approach, the devices that are used for directing power from the input to the output(s) could be thyristors or a functional equivalent, such as field effect transistors (FETs) with series diodes, or by hermetically sealed high voltage relays. Control circuitry can convey the intention of a system controller (a human or an automatic control system) into the voltages and currents required for the switching devices to take on conducting or blocking states as commanded.

In one aspect, the switch assembly can support a multi-machine configuration, where one machine can be driven harder than a continuous rating of the machine until the machine starts to get too hot for reliable operation. The switch assembly can then turn off this machine and turn on another machine. As a result, the switch assembly effectively manages the temperature of each machine by modulating the usage of the machines, while maintaining higher output from the machines than if the machines operated on their own. In one aspect, the switch assembly can be used to power multiple machines at the same time. While the description herein focuses on the switch assembly controlling the conduction of current to two machines, optionally, the switch assembly can control the conduction of current to three or more machines.

One or more embodiments of the switch assemblies and methods described herein can reduce costs of power delivery systems, by reducing the costs of cables used to power the machines. For example, in a system that delivers power to submersible pumps in a well, the cost of the power cable that supplies current to the pumps can comprise a large amount of the total cost of the system (e.g., 40% or more). The switch assembly can reduce the amount of cable needed, and thus the cost of the system, by controlling the delivery of current to multiple machines from a single cable (or a reduced number of cables relative to a system that does not use the switch assembly). Additionally, the switch assembly can provide redundancy to the system, by activating a backup machine if a primary machine fails.

FIG. 1 illustrates a schematic diagram of a power delivery system 100 having one embodiment of a switch assembly 102. The power delivery system 100 controls the supply of electric current to plural machines 104 (e.g., machines 104A, 104B) from a power source 106. The power source 106 may be an alternator, generator, or any other source of electric current, such as a variable speed drive. The machines 104 may be systems or devices that perform work when powered by the electric current. In the illustrated embodiment, the machines 104 are submersible pumps located in a well 108 at a significant depth below a surface 110. A relatively long power cable 112 extends from the power source 106 to the switch assembly 102 in order to deliver electric current from the power source 106 to the switch assembly 102. The cable 112 is shown in broken form to represent the long length of the cable 112.

The cable 112 may conduct a multi-phase current from the power source 106 to the switch assembly 102. For example, the cable 112 can conduct a three phase current to the switch assembly 102. The switch assembly 102 includes plural switching devices 114 arranged in a switching matrix (described below) and a drive unit 116. The drive unit 116 activates or deactivates, closes or opens, turns off or turns on, etc., the switching devices 114 to control which machines 104 receive current based on the commands received from the surface through the power cable 112. In one embodiment, the drive unit 116 may be remotely controlled by a controller disposed outside of the well 108, such as by communicating from the controller to the drive unit 116 via the cable 112 or another cable using power line communications, by wireless communication, or the like.

Several output cables 118 (e.g., cables 118A, 118B) conductively couple the switch assembly 102 with the machines 104. The output cables 118 supply the current that is conducted by the activated or closed switches 114 to the corresponding machine 104.

Figure 2:
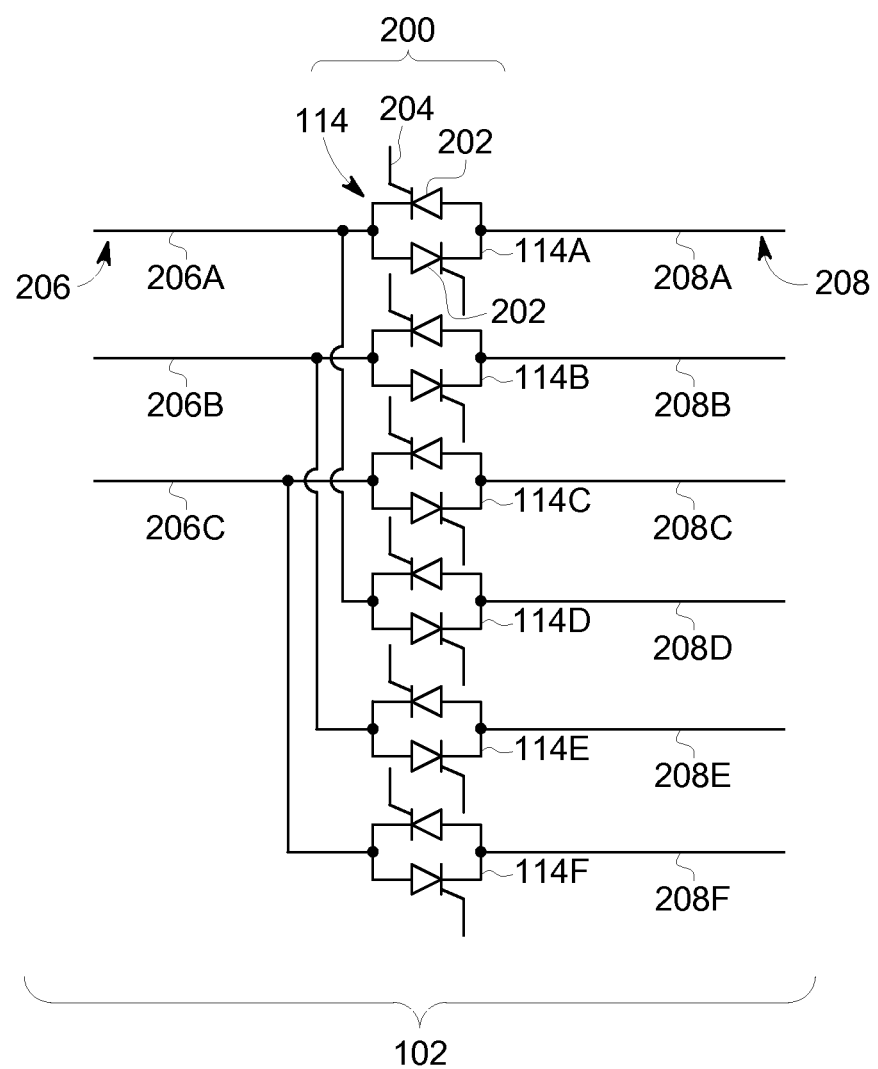
FIG. 2 is a circuit diagram of the switch assembly shown in FIG. 1 according to one embodiment.

FIG. 2 is a circuit diagram of the switch assembly 102 according to one embodiment. The switch assembly 102 includes a switch matrix or switch array 200 formed from several switch devices 114. The switch devices 114 are bi-directional (in voltage and current) switch devices that operate to control the conduction of current in both directions (e.g., from the left to the right and from the right to the left in the perspective of FIG. 2) and block the positive and negative voltages across the switch devices. The switch devices 114 include switches 202, which can be solid state semiconductor devices or other types of switches. By way of example, the switches 202 can include thyristors (e.g., silicon carbide thyristors in series with a SiC diode for asymmetrical devices or simply SiC thyristors for symmetrical devices), combination of field effect transistors (FETs, such as silicon carbide FETs) with series diodes (e.g. independent SiC Bipolar (PiN) diodes or the MOSFET own body diode), high voltage hermetic relays, surface-based transfer switches, or the like. In the illustrated embodiment, the switch devices 114 each include two switches 202 disposed in antiparallel. Optionally, another type and/or arrangement of switches 202 may be used.

The switches 202 include gate terminals 204 that are conductively coupled with the drive unit 116 shown in FIG. 1. The drive unit 116 applies a trigger current to the gate terminal 204 of a switch 202 to close the switch 202 and cause it to conduct electric current and/or can remove the trigger current from the gate terminal 204 to open the switch 202 and prevent the switch 202 from conducting electric current.

The switch assembly 102 includes several conductive input lines 206 (e.g., input lines 206A-C) that conduct different phases of the current supplied from the cable 112 (shown in FIG. 1). While three input lines 206 are shown, alternatively, fewer or higher number of input lines 206 may be used. The input lines 206 are separate but not independent from each other so that the input line 206A conducts one phase of the current from the cable 112 (e.g., "Phase a input"

in FIG. 2), the input line 206B separately conducts another phase of the current from the cable 112 (e.g., "Phase b input" in FIG. 2), and the input line 206C separately conducts another phase of the current from the cable 112 (e.g., "Phase c input"). In one aspect, each one of the input lines 206 only conducts a single phase of the input current received from the single cable 112.

In the illustrated embodiment, the switch matrix 200 includes six switching devices 114 (e.g., switching devices 114A-F), although a larger or lesser number of switching devices 114 may be included. The input lines 206 split into branches that are coupled with different switching devices 114. For example, the input line 206A connects with the switching devices 114A and 114D. The input line 206B connects with the switching devices 114B and 114E. The input line 206C connects with the switching devices 114C and 114F. As a result, the different input lines 206 each conduct different phases of the current to different switching devices 114.

The switching devices 114 also are connected with several separate conductive output lines 208 (e.g., output lines 208A-F). The switching devices 114 are controlled (e.g., by the drive unit 116) to conduct or prevent conduction of different phases of the current received from the cable 112 to different output lines 208. For example, closing the switching device 114A allows current to pass between the Phase a input line 206A to the output line 208A as a "Phase a output 1" of the current. Closing the switching device 114D also allows current to pass between the Phase a input received from the input line 206A, but to a different output line 208D as a "Phase a output 2" of the current.

Closing the switching device 114B allows current to pass between the Phase b input of the current received from the input line 206B to the output line 208B as a "Phase b output 1" of the current. Closing the switching device 114E also allows current to pass between the Phase b input received from the input line 206B, but to a different output line 208E as a "Phase b output 2" of the current.

Closing the switching device 114C allows current to pass between the Phase c input of the current received from the input line 206C to the output line 208C as a "Phase c output 1" of the current. Closing the switching device 114F also allows current to pass between the Phase c input received from the input line 206C, but to a different output line 208F as a "Phase c output 2" of the current.

Different groups or sets of the output lines 208 can be conductively coupled with different loads 104 (shown in FIG. 1 as machines). For example, the output lines 208A, 208B, and 208C can be a first group or set of the output lines 208. This first set of output lines 208A-C can be conductively coupled with and/or extend through an output cable 118 (shown in FIG. 1) that is conductively coupled with the machine 104A (shown in FIG. 1). The output lines 208D, 208E, and 208F can be a different, second group or set of the output lines 208. This second set of output lines 208D-F can be conductively coupled with and/or extend through another output cable 118 that is conductively coupled with the machine 104B (shown in FIG. 1).

In operation, different groups of the switching devices 114 are closed to conduct multiple phases of the current to one or more machines 104. For example, to power the machine 104A, the switching devices 114A-C are closed. Closing these switching devices 114A-C causes the three phases of the input current (e.g., Phase a input, Phase b input, and Phase c input) to allow current to pass to the machine 104A to power the machine 104A along the output lines 208A-C as Phase a output 1, Phase b output 1, and Phase c output 1.

To power the machine 104B, the switching devices 114D-F are closed. Closing these switching devices 114D-F causes the three phases of the input current (e.g., Phase a input, Phase b input, and Phase c input) to allow current to pass to the machine 104B to power the machine 104B along the output lines 208D-F as Phase a output 2, Phase b output 2, and Phase c output 2. Additional switching devices 114 may be used to separately conduct different phases of the input current to additional machines 104.

To turn off the supply of current to one or more of the machines 104, the corresponding switching devices 114 are opened. For example, to stop powering the machine 104A, the switching devices 114A-C can be opened. Opening these switching devices 114A-C stops conduction of the three phases of the input current (e.g., Phase a input, Phase b input, and Phase c input) to the machine 104A along the output lines 208A-C. To stop powering the machine 104B, the switching devices 114D-F can be opened. Opening these switching devices 114D-F stops conduction of the three phases of the input current (e.g., Phase a input, Phase b input, and Phase c input) to the machine 104B.

The switching devices 114 can be individually controlled so that multiple machines 104 can be individually powered or not powered by current from the same cable 112. For example, the cable 112 can provide power to multiple machines 104, with the switch assembly 102 individually controlling which machines 104 are powered by turning on or off different groups or sets of the switching devices 114, as described above. As a result, the number of machines 104 that are powered by a cable 112 can be increased relative to currently known systems. While only a single cable 112 is shown in FIG. 1, multiple cables 112 may be provided, with one or more of the cables 112 supplying power to multiple machines 104 via one or more corresponding switch assemblies 102.

In one aspect, the switch assembly 102 can be used to power one machine 104A with more current than a designated limit of the machine 104A (e.g., more than a continuous rating limit of the machine 104A). If the machine 104A begins to overheat or experience any performance problems, the switch assembly 102 can cut off power to the machine 104A and supply power to the machine 104B.

Figure 3:
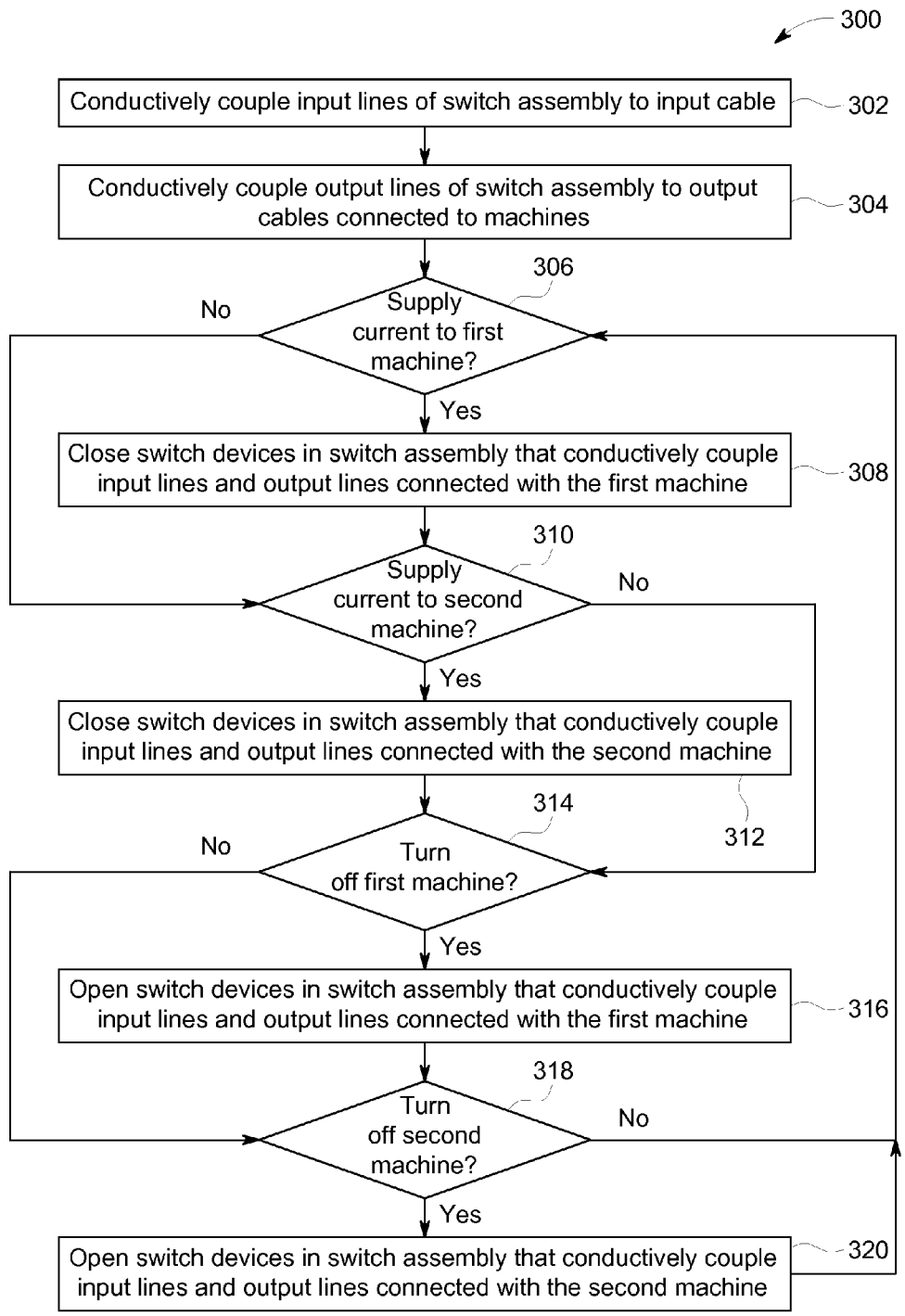
FIG. 3 illustrates a flowchart of a method for powering multiple machines from a cable according to one embodiment.

FIG. 3 illustrates a flowchart of a method 300 for powering multiple machines from a single cable according to one embodiment. At 302, input lines of a switch assembly are conductively coupled with an input cable. As described above, the input cable can provide a multi-phase current to the input lines, with a different phase of the current conducted to a different input line. At 304, output lines of the switch assembly are conductively coupled with machines, such as by being connected with output cables that are conductively coupled with the machines.

At 306, a determination is made as to whether current received from the input cable is to be conducted to a first machine via the switch assembly. If the first machine is to receive the current, then flow of the method 300 can proceed to 308. Otherwise, flow of the method 300 may proceed to 310. At 308, switching devices in the switch assembly that are conductively disposed between the input lines of the input cable and the output lines connected to the first machine are closed. These switching devices are closed in order to conduct the different phases of the current through different switching devices to different output lines. The output lines conduct the different phases of current to the first machine in order to power the first machine.

At 310, a determination is made as to whether current received from the input cable is to be conducted to a second machine via the switch assembly. If the second machine is to receive the current, then flow of the method 300 can proceed to 312. Otherwise, flow of the method 300 may proceed to 314. At 312, switching devices in the switch assembly that are conductively disposed between the input lines of the input cable and the output lines connected to the second machine are closed. These switching devices are closed in order to conduct the different phases of the current through different switching devices to different output lines. The output lines conduct the different phases of current to the second machine in order to power the second machine.

Optionally, if additional machines are connected to the switch assembly, the determination of whether to close one or more sets or groups of switching devices associated with the additional machines to conduct different phases of the current to those additional machines may be repeated.

At 314, if the first machine is powered by the current conducted through the switch assembly, then a determination is made as to whether to turn off the first machine by stopping conduction of the current from the input cable to the first machine. If the first machine is to be turned off, then flow of the method 300 can proceed to 316. Otherwise, flow of the method 300 may proceed to 318.

At 316, switching devices in the switch assembly that are conductively disposed between the input lines of the input cable and the output lines connected to the first machine are opened. These switching devices are opened in order to stop conduction of the different phases of the current to the first machine.

At 318, if the second machine is powered by the current conducted through the switch assembly, then a determination is made as to whether to turn off the second machine by stopping conduction of the current from the input cable to the second machine. If the second machine is to be turned off, then flow of the method 300 can proceed to 320. Otherwise, flow of the method 300 may return to 306. Alternatively, operation of the method 300 may terminate.

At 320, switching devices in the switch assembly that are conductively disposed between the input lines of the input cable and the output lines connected to the second machine are opened. These switching devices are opened in order to stop conduction of the different phases of the current to the second machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings. Further, functions that are suggestive of program logic through software can be implemented in hardware logic.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:
1. A system comprising:
plural conductive input lines configured to be conductively coupled with a cable that conducts a multi-phase electric current to the input lines, the input lines configured to separately conduct different phases of the electric current;

plural conductive output lines configured to be conductively coupled with plural machines, the output lines configured to separately conduct the different phases of the electric current; and a switch assembly having plural switching devices conductively coupled with the input lines and with the output lines, the switching devices configured to block the positive and negative voltages across the switching devices, the switch assembly configured to control the switching devices in order to conduct the different phases of the electric current to the machines, wherein the switch assembly is configured to close a first set of the switching devices to separately conduct the different phases of the electric current to a first machine of the machines, and the switch assembly is configured to separately close a different, second set of the switching devices to separately conduct the different phases of the electric current to a different, a second machine of the machines, wherein the switch assembly is configured to operate in a multi-machine modulation configuration by increasing an output of the first machine of the machines above a designated rating limit of the first machine until a temperature of the first machine exceeds a designated threshold, and by switching conduction of the current to the second machine of the machines and stopping conduction of the current to the first machine responsive to the temperature of the first machine exceeding the designated threshold.

2. The system of claim 1, wherein a first input line of the input lines is configured to conduct a first phase of the electric current and is configured to be conductively coupled with at least a first switching device of the switching devices in the first set of the switching devices and with at least a second switching device of the switching devices in the second set of the switching devices.

3. The system of claim 2, wherein a first output line of the output lines is configured to conduct the first phase of the electric current from the first switching device to the first machine and a second output line of the output lines is configured to conduct the first phase of the electric current from the second switching device to the second machine.

4. The system of claim 2, wherein a second input line of the input lines is configured to conduct a different, second phase of the electric current and is configured to be conductively coupled with at least a third switching device of the switching devices in the first set of the switching devices and with at least a fourth switching device of the switching devices in the second set of the switching devices.

5. The system of claim 4, wherein a third output line of the output lines is configured to conduct the second phase of the electric current from the third switching device to the first machine and a fourth output line of the output lines is configured to conduct the second phase of the electric current from the fourth switching device to the second machine.

6. The system of claim 3, wherein a third input line of the input lines is configured to conduct a different, third phase of the electric current and is configured to be conductively coupled with at least a fifth switching device of the switching devices in the first set of the switching devices and with at least a sixth switching device of the switching devices in the second set of the switching devices.

7. The system of claim 6, wherein a fifth output line of the output lines is configured to conduct the third phase of the electric current from the fifth switching device to the first machine and a sixth output line of the output lines is configured to conduct the third phase of the electric current from the sixth switching device to the second machine.

8. The system of claim 1, wherein the machines include submersible pumps disposed inside a well and the switch assembly is configured to be disposed inside the well and coupled with the cable inside the well.

9. The system of claim 1, wherein the switch assembly is configured to control which of the switching devices are closed based on instructions received via power line communications sent through the cable.

10. The system of claim 1, wherein the switching devices include one or more of a solid state switch, a switch formed from one or more semiconductor materials, a silicon carbide thyristor, a silicon carbide field effect transistor and diode, a hermetic relay, a transfer switch, a gallium nitride switch, a diamond switch, another high temperature material switch, an insulated gate bipolar transistor (IGBT), an insulated gate commutated transistor (IGCT), a metal oxide semiconductor thyristor (MCT), a metal oxide semiconductor turn off thyristor (MTO), a bipolar junction transistor (BJT), a junction gate field effect transistor (JFET), a gate turn off thyristor (GTO), a dynistor, a bi-mode insulated gate thyristor (BIGT), or a super gate turn off thyristor (SGTO).

11. The system of claim 1, wherein the switch assembly is configured to individually control which of the machines receives the electric current such that the switch assembly is configured to power a single one of the machines, two of the machines, three or more but less than all of the machines, or all of the machines at a time.

12. A system comprising:
a switch assembly having plural switching devices conductively coupled and disposed between a cable that supplies a multi-phase electric current and with separate machines that are powered by the electric current, the switching devices configured to block the positive and negative voltages across the switching devices, the switch assembly configured to control different sets of the switching devices to separately conduct different phases of the electric current to the machines, wherein each of the switching devices in each of the sets of the switching devices is configured to conduct a different phase of the phases of the electric current, wherein the switch assembly is configured to operate in a multi-machine modulation configuration by increasing an output of the first machine of the machines above a designated rating limit of the first machine until a temperature of the first machine exceeds a designated threshold, and by switching conduction of the current to the second machine of the machines and stopping conduction of the current to the first machine responsive to the temperature of the first machine exceeding the designated threshold.

13. The system of claim 12, further comprising plural conductive input lines configured to be conductively coupled with the cable and with the switching devices, the input lines configured to separately conduct the different phases of the electric current from the cable to the switching devices in the different sets of the switching devices.

14. The system of claim 13, wherein each of the input lines is configured to be conductively coupled with at least one of the switching devices in each of the sets of the switching devices.

15. The system of claim 12, further comprising plural conductive output lines configured to be conductively coupled with the machines and with the switching devices, the output lines configured to separately conduct the different phases of the electric current from the different sets of the switching devices to the machines.

16. The system of claim 12, wherein the switch assembly is configured to control which of the switching devices are closed based on instructions received via power line communications sent through the cable or other communication approaches.

17. The system of claim 12, wherein the switching devices include one or more of a solid state switch, a switch formed from one or more semiconductor materials, a silicon carbide thyristor, a silicon carbide field effect transistor and diode, a hermetic relay, a transfer switch, a gallium nitride switch, a diamond switch, another high temperature material switch, an insulated gate bipolar transistor (IGBT), an insulated gate commutated transistor (IGCT), a metal oxide semiconductor thyristor (MCT), a metal oxide semiconductor turn off thyristor (MTO), a bipolar junction transistor (BJT), a junction gate field effect transistor (JFET), a gate turn off thyristor (GTO), a dynistor, a bi-mode insulated gate thyristor (BIGT), or a super gate turn off thyristor (SGTO).

18. The system of claim 12, wherein the machines include submersible pumps disposed inside a well and the switch assembly is configured to be disposed inside the well and coupled with the cable inside the well.

19. The system of claim 12, wherein the switch assembly is configured to individually control which of the machines receives the electric current such that the switch assembly is configured to power a single one of the machines, two of the machines, three or more but less than all of the machines, or all of the machines at a time.

20. A method comprising:
conductively coupling plural conductive input lines with a cable that conducts a multi-phase electric current to the input lines so that the input lines separately conduct different phases of the electric current;
conductively coupling plural conductive output lines configured to be conductively coupled with plural machines so that the output lines separately conduct the different phases of the electric current;
conductively coupling plural switching devices of a switching assembly with the input lines and with the output lines so that the switch assembly controls the switching devices in order to conduct the different phases of the electric current to the machines, wherein the switching devices are configured to block the positive and negative voltages across the switching devices;
increasing an output of a first machine of the machines until a temperature of the first machine exceeds a designated threshold;
closing a first set of the switching devices to separately conduct the different phases of the electric current to the first machine of the machines responsive to the temperature of the first machine; and
separately closing a different, second set of the switching devices to separately conduct the different phases of the electric current to a different, second machine of the machines.

21. The method of claim 20, further comprising opening the first set of the switching devices to stop conduction of the different phases of the electric current to the first machine while the second set of switches remain closed to conduct the different phases of the electric current to the second machine.

22. The method of claim 20, further comprising receiving instructions to close one or more of the first set of the switching devices or the second set of the switching devices via power line communications sent through the cable or other communication approaches.

* * * * *